United States Patent
Obata

(10) Patent No.: US 7,110,138 B2
(45) Date of Patent: Sep. 19, 2006

(54) APPARATUS, METHOD AND COMPUTER PROGRAM PRODUCT FOR PERFORMING IMAGE FORMATION

(75) Inventor: Masahito Obata, Narashino (JP)

(73) Assignee: Ricoh Company, Ltd., Tokyo (JP)

( * ) Notice: Subject to any disclaimer, the term of this patent is extended or adjusted under 35 U.S.C. 154(b) by 930 days.

(21) Appl. No.: 09/809,302

(22) Filed: Mar. 16, 2001

(65) Prior Publication Data
US 2001/0050776 A1 Dec. 13, 2001

(30) Foreign Application Priority Data
Mar. 16, 2000 (JP) .............................. 2000-074482

(51) Int. Cl.
*B41B 1/00* (2006.01)
*H04N 1/393* (2006.01)
(52) U.S. Cl. ........................................ 358/1.2; 358/1.7
(58) Field of Classification Search ............... 358/1.18, 358/1.2, 450, 449, 462, 464; 382/284, 294, 382/181, 190, 224
See application file for complete search history.

(56) References Cited

U.S. PATENT DOCUMENTS 6,233,000 B1 * 5/2001 Obata et al. ................. 347/254
6,381,376 B1 * 4/2002 Toyoda ....................... 382/284

FOREIGN PATENT DOCUMENTS

JP 2000-103117 * 4/2000

* cited by examiner

Primary Examiner—Kimberly Williams
Assistant Examiner—Scott Schlack
(74) Attorney, Agent, or Firm—Oblon, Spivak, McClelland, Maier & Neustadt, P.C.

(57) ABSTRACT

An image forming apparatus, method and computer program product, including a pattern detecting device configured detect whether or not a pattern is constructed with a lengthwise line of a single dot width on a basis of a pattern of respective multi-value data of a target pixel and circumferential pixels adjacent thereto in a main scanning direction; and a printing device configured to print size-reduced printing dots of the lengthwise line of the single dot width detected by the pattern detecting device.

32 Claims, 14 Drawing Sheets

RELATIONSHIP BETWEEN TEMPERATURE
DATA AND PRINTING DOT

RELATIONSHIP BETWEEN PHASE
DATA AND PRINTING POSITION

FIG. 7

{ Dc1, Dc2, Dc3 } = ( 0, 0, 1, 1, 0, 0 )  Dp1  ⎫
{ Dc1, Dc2, Dc3 } = ( 0, 0, 1, 0, 0, 0 )  Dp2  ⎬ BLACK ONE-DOT LINE
{ Dc1, Dc2, Dc3 } = ( 0, 0, 0, 1, 0, 0 )  Dp3  ⎭

{ Dc1, Dc2, Dc3 } = ( 1, 1, 1, 1, 0, 0 )  Dp4  ⎫
{ Dc1, Dc2, Dc3 } = ( 0, 0, 1, 1, 1, 1 )  Dp5  ⎪
{ Dc1, Dc2, Dc3 } = ( 1, 1, 1, 0, 0, 0 )  Dp6  ⎪
{ Dc1, Dc2, Dc3 } = ( 0, 0, 1, 0, 1, 1 )  Dp7  ⎬
{ Dc1, Dc2, Dc3 } = ( 1, 1, 0, 1, 0, 0 )  Dp8  ⎪
{ Dc1, Dc2, Dc3 } = ( 0, 0, 0, 1, 1, 1 )  Dp9  ⎭

{ Dc1, Dc2, Dc3 } = ( 1, 1, 1, 0, 1, 1 )  Dp10 ⎫ WHITE ONE-DOT LINE
{ Dc1, Dc2, Dc3 } = ( 1, 1, 0, 1, 1, 1 )  Dp11 ⎭

{ Dc1, Dc2, Dc3 } = ( X, X, 0, 0, X, X )
{ Dc1, Dc2, Dc3 } = ( X, X, 0, 1, X, X )
{ Dc1, Dc2, Dc3 } = ( X, X, 1, 0, X, X )
{ Dc1, Dc2, Dc3 } = ( X, X, 1, 1, X, X )

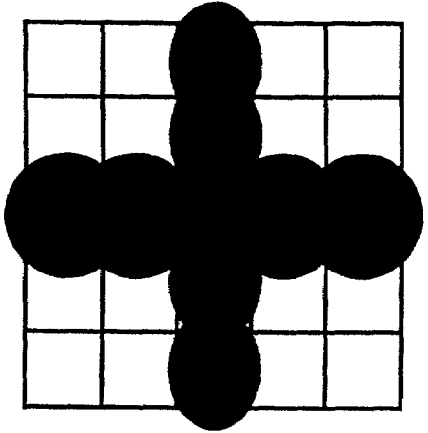
FIG. 12C COPIED OUTPUT IMAGE
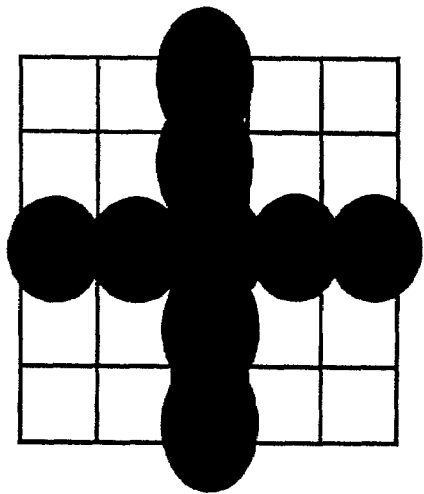
FIG. 12D COPIED OUTPUT IMAGE
FIG. 12B OUTPUT OF IMAGE PROCESSING SECTION
| 0 | 0 | 11 | 0 | 0 |
|---|---|----|---|---|
| 0 | 0 | 11 | 0 | 0 |
| 11 | 11 | 11 | 11 | 11 |
| 0 | 0 | 11 | 0 | 0 |
| 0 | 0 | 11 | 0 | 0 |
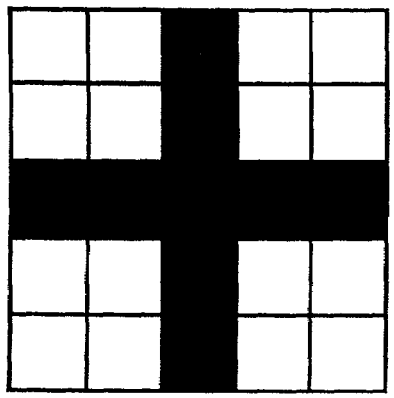
FIG. 12A INPUT IMAGE

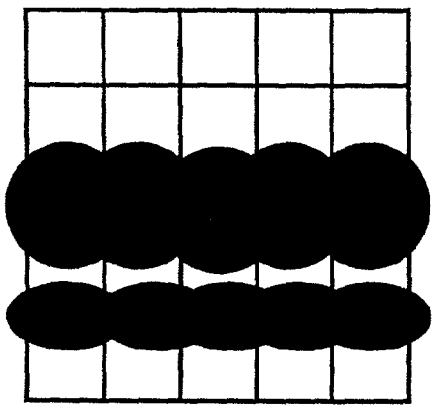
FIG. 13C
COPIED OUTPUT IMAGE
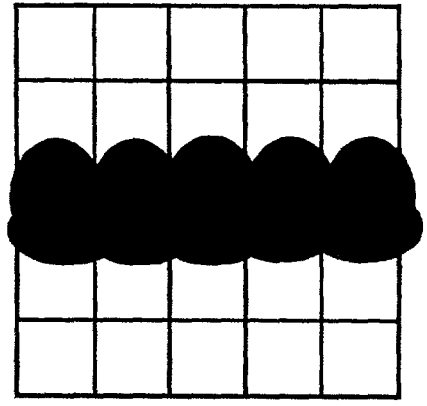
FIG. 13D
COPIED OUTPUT IMAGE
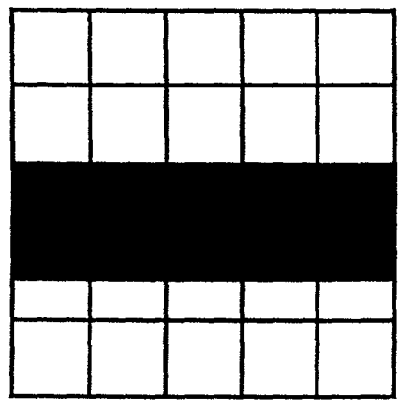
FIG. 13B
OUTPUT OF IMAGE PROCESSING SECTION
FIG. 13A
INPUT IMAGE

APPARATUS, METHOD AND COMPUTER PROGRAM PRODUCT FOR PERFORMING IMAGE FORMATION

CROSS-REFERENCE TO RELATED APPLICATIONS

This application claims benefit of priority under 35 USC § 119 to Japanese Patent Application No. 2000-074482 filed in the Japanese Patent Office on Mar. 16, 2000, the entire contents of which is incorporated by reference herein.

BACKGROUND OF THE INVENTION

1. Field of the Invention

The present invention relates to apparatus, method and computer program product for performing improved image formation in, for example, a laser printer, digital copying machine, etc.

2. Discussion of the Background

With respect to methods for forming an image in a digital copying machine, there is generally known a negative/positive (N/P) process in which laser light is radiated on a position corresponding to a black portion of manuscript data. The image is formed by putting toner on a radiated area. Since a diameter of the laser light beam is usually larger than a theoretical size of a single dot (i.e., with respect to dots per inch (DPI)), in the N/P process when the image is formed on a portion where the laser light is radiated (i.e., the image portion area), a black line of a single dot width is usually reproduced thicker than the theoretical single dot width. Although this results in a continuous reproduced line, the reproduced line, however, is thicker than the width of the theoretical single dot.

Accordingly, since the reproduced single dot black line becomes thicker than the black line of the manuscript document and the white single dot line becomes thinner, there arises a problem that the reproducibility may be worsened. In particular, in the case of the so-called grandson copying of re-using the copied sheet as the manuscript document, the phenomenon thereof appearing at that time may become further prominent.

Furthermore, as the troublesome matter of forming the electrophotographic image, there is a difference in the reproducibility of the lengthwise line and the transverse line. In general, the lengthwise line is reproduced thickly than the transverse line. Therefore, when the image forming condition is determined, the transverse line is apt to be made thinner than the manuscript document at the time of fitting to the lengthwise line. In contrast, the lengthwise line is apt to be made thicker than the manuscript document at the time of fitting to the transverse line. Those are the troublesome matters to be solved. That results in the difficulty of deciding the image forming condition.

In such the situation, as the background art of solving the troublesome matters, for instance, the published specification of Japanese Laid-open Patent Publication No. 5-75816 discloses the technology of preventing the ruin (destruction) of the non-image part on the single dot line and thereby improving the reproducing property by determining the density of the target pixel and the more than two pixels immediately adjacent thereto for the binary-value image data. Furthermore, the published specification of Japanese Laid-open Patent Publication No. 6-89338 discloses the technology of determining the print starting position of the target pixel on a basis of the relationship between the target pixel and the pixels adjacent thereto for the multiple-value image and putting the target pixel close to the adjacent pixels and printing the image in such the state, and thereby the reproducibility of the fine line and the edge portion of the image can be improved.

However, according to the technology disclosed in Japanese Laid-open Patent Publication No. 5-75816, since the reproducibility of the single dot line can be improved by compensating the density only for the binary image data, there arises the other problems (troublesome matters to be solved) that the edge portion of the line extending over the plural pixels for the multi-value image and the single dot line of the black color become too thick, or, in contrast, the single dot line of the white color is destroyed (the aforementioned phenomenon of the ruin or destruction). In addition, the thickness of the lengthwise line and the transverse line become different from each other. Those matters are also the problems to be solved.

Furthermore, according to the technology disclosed in Japanese Laid-open Patent Publication No. 6-89338, only it is possible to improve the reproducibility of the fine lines divided into two or more pixels and the edge portion of the image. However, the compensation of the line width is not taken into consideration when the thickness of the lengthwise line and the transverse line differ from each other. Those matters are also the problems to be solved.

Moreover, in both of the above-mentioned technologies, it was impossible to select whether or not the compensation is performed or not performed in consideration of the unevenness between the machines in accordance with the image pattern.

SUMMARY OF THE INVENTION

Heretofore, the background arts regarding the image forming apparatus have been described. However, according to such the background arts, there exists no advantageous functional effect for improving the image forming apparatus. The present invention has been made in view of the above-discussed problems and the other problems, and solved the abovementioned defects and troublesome matters of the background arts.

To state in more detail, in consideration of the aforementioned problems of the background arts, the present invention aims at providing the image forming apparatus capable of preventing the phenomena that, for the multi-value image, the edge portion of the line of the plural dot width, and the black line of the single dot width become too thick, the white line of the single dot width is ruined (destroyed), or the thickness of the lengthwise line and the transverse line are made different from each other.

The present invention further aims at providing the image forming apparatus capable of changing over whether or not the pattern is employed, and thereby not performing the unnecessary compensation when the compensation is not required in accordance with the pattern due to the factor such as the difference between the developing conditions.

The present invention still further aims at simplifying the structure of the hardware by decreasing the number of the patterns to be detected, and preventing the occurrence of the abnormal image due to performing of the unnecessary compensation.

The above and other objects are achieved according to the present invention by providing a novel image forming apparatus, method and computer program product, including a pattern detecting device configured detect whether or not a pattern is constructed with a lengthwise line of a single dot width on a basis of a pattern of respective multi-value data of a target pixel and circumferential pixels adjacent thereto in a main scanning direction; and a printing device configured to print size-reduced printing dots of the lengthwise line of the single dot width detected by the pattern detecting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is an explanatory diagram illustrating the matching pattern detected by the pattern detecting section shown in FIG. 2;

FIGS. 12A through 12D are explanatory diagrams illustrating the fine-line processing in the image processing circuit shown in FIG. 2;

FIGS. 13A through 13D are explanatory diagrams illustrating the width-shortening processing in the image processing circuit shown in FIG. 2.

DETAILED DESCRIPTION OF THE PREFERRED EMBODIMENTS

Figure 1:
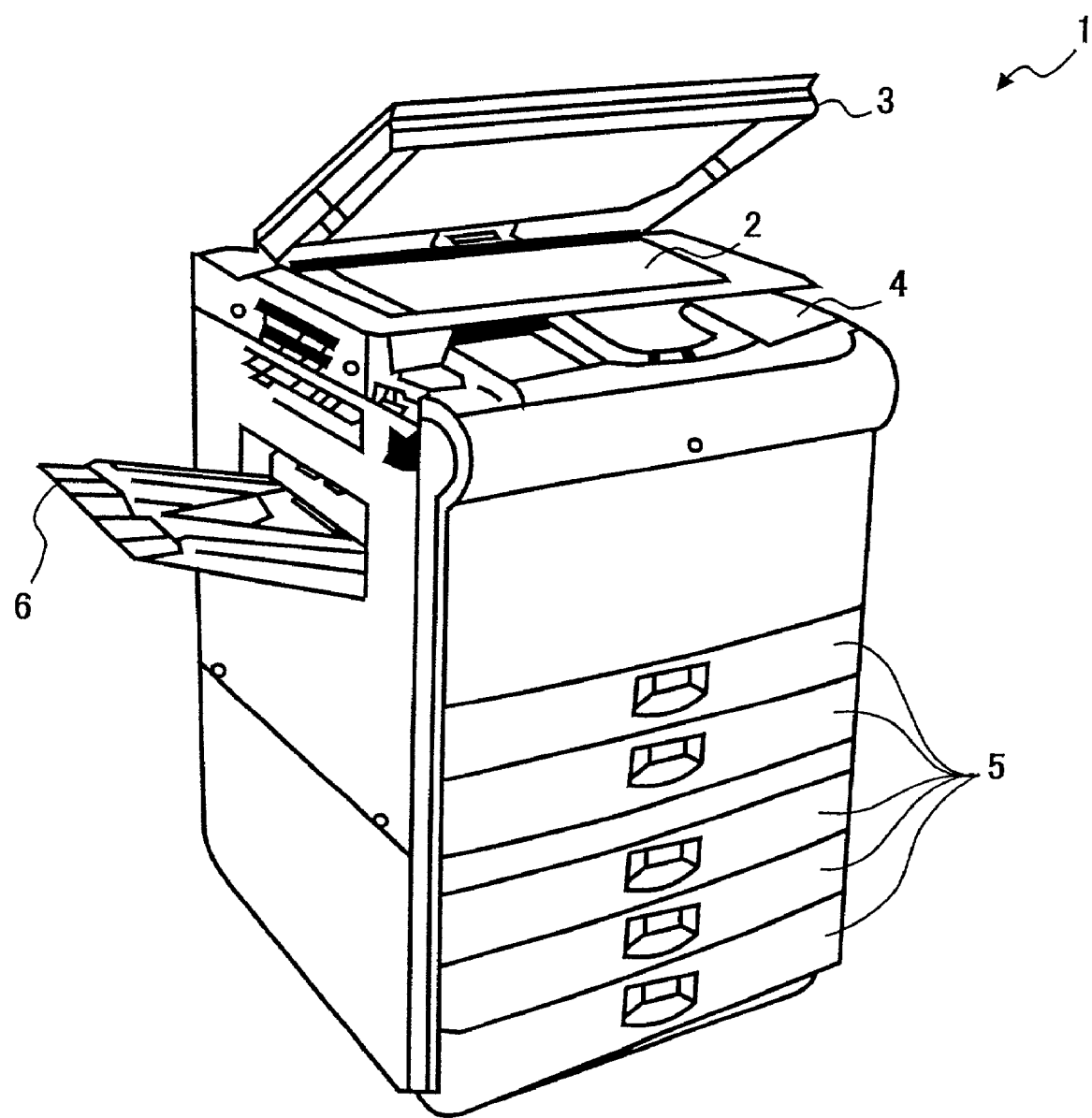
FIG. 1 is an external appearance view illustrating a digital copying machine as the first embodiment of the image forming apparatus according to the present invention.

In describing the preferred embodiment of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

Referring now to the accompanying drawings; wherein like reference numerals designate identical or corresponding parts throughout the several views or diagrams, and more particularly to FIGS. 1 through 14, thereof, there are illustrated the improved image forming apparatus.

To state in more detail, in order to solve the aforementioned subject matters, the image forming apparatus of the present invention comprises a pattern detecting device (section) and a printing device (section).

For the purpose of attaining the above-mentioned objects of the present invention, the image forming apparatus of the invention is constructed so as to include the pattern detecting device for detecting whether or not the pattern is constructed with a lengthwise line of a single dot width on a basis of the pattern of the respective multi-value data of the target pixel and the circumferential pixels adjacent thereto in the main scanning direction; and the printing device for printing size-reduced printing dots of the lengthwise line of the single dot width detected by the pattern detecting device.

On this occasion, the pattern detecting device is preferably constructed so as to detect whether or not the pattern is the edge of the lengthwise line of the plural dot width on the base of the respective multi-value data patterns of the target pixel and the circumferential pixels adjacent to each other in the main scanning direction, and the printing device is also preferably constructed so as to performing the printing operation with the small printing dots of the plural dot widths. At that time, the pattern detecting device judges that the detected pattern is the edge of the lengthwise line of a single dot width or plural dot width, when the pixels situated at the right and left sides of the target pixel are white or black and the target pixel is of halftone or black. Furthermore, the printing device performs the width-approaching so as to bring the adjacent dots into contact with each other, when the printing operation is performed with small printing dots of the plural dot width.

Furthermore, the pattern detecting device is preferably constructed so as to detect whether or not the lengthwise line is the white lengthwise line of a single dot width or less than single dot width, on a basis of the patterns of the respective multi-value data of the target pixel and the circumferential pixels adjacent thereto in the main scanning direction; and the printing device is also preferably constructed so as to perform the printing operation with further small printing dot of the white lengthwise line detected by the pattern detecting device. Furthermore, the pattern detecting device is preferably constructed so as to further add thereto the plural different pattern detecting units for detecting the patterns and so as to enable to select one of those plural pattern detecting units to be operated.

The pattern detecting device and the printing device are constructed so as to generate code data including data representing coincidence or non-coincidence with the plural patterns and density data of the target pixel; and so as to generate the specified code data in the case of coinciding with the specified pattern among the plural patterns; and so as to convert the data obtained by decoding the code data to the light-emitting data and thereby to change the size of the printing dot. Furthermore, the pattern detecting device and the printing device generate the data showing the coincidence with the plural pattern and the code data including the density data of the target pixel. Furthermore, when the pattern coincides with the specified pattern in the aforementioned plural patterns, the both devices are preferably constructed so as to generate the specified code data. The both devices convert the data obtained by decoding the code data to the light-emitting data. Thereby, the size of the printed dot can be changed.

First Embodiment

The first embodiment of the present invention is described hereinafter, referring to the accompanying drawings. FIGS. 1 through 13 illustrate the first embodiment of the invention.

On the upper part of the digital copying machine 1 shown in FIG. 1, there are provided an original document stand 2 for putting the document thereon and reading out the document, a pressing plate 3 for pressing the document on the document stand 2, and an operation board section 4 for performing the operations such as settings of the reading-out mode and the copying magnification/reduction, etc. and the representation (display) to the operator. Furthermore, a paper feeding section 5 is provided on the lower part thereof, and a paper discharging section 6 is provided on the left side thereof. In order to realize the operation as the copying machine, the well-known mechanism and control device of the digital copying machine such as an exposing optical system, a paper conveying system, a developing system, a fixing system, and a paper discharging system, etc. are included in the interior of the digital copying machine 1, although all of them are omitted in FIG. 1.

In such the construction, after putting the original document on the original document stand 2 and bringing the document into close contact with the document stand 2 by use of the pressing plate 3, the illumination system and the focusing optical system both not shown in FIG. 1 performs the operation of reading out the original document. And then, after performing the various compensations for the read-out image data, the light beam is radiated onto the photosensitive body not shown in FIG. 1 from the laser diode (hereinafter, called LD) in the writing system on a basis of the image data, and thereby an electrostatic latent image is formed on the not-shown photosensitive body. Thereafter, through the well-known electrophotographic process, the copy image is formed on the recording paper fed by the paper feeding section 5 under the instruction (command) of the operation board 4.

Figure 2:
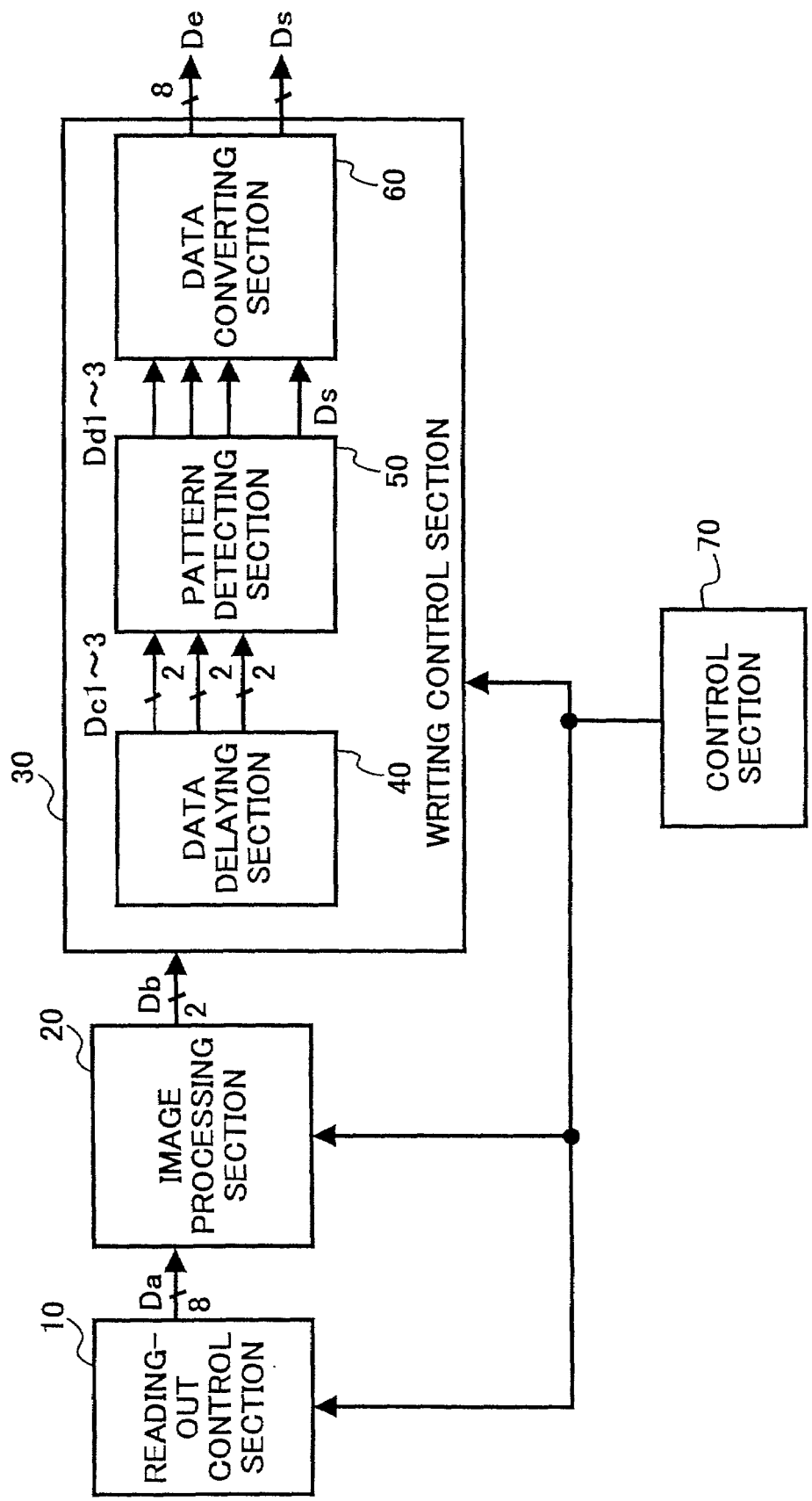
FIG. 2 is a block diagram illustrating the image processing circuit in the digital copying machine shown in FIG. 1.

FIG. 2 illustrates the image processing circuit in the digital copying machine 1. At first, in the reading-out process section 10, the various compensations such as the shading compensation are performed for the image data read out, for instance, with 600 dpi by the not-shown CCD line sensor. And then, the image data Da of 8 bits per one pixel (256-halftone) are outputted to an image processing section 20. In the image processing section 20, the MTF compensation, the magnification/reduction processing, etc. are performed for the image data Da in order to compensate the image. Thereafter, the image data Da are converted to the image data Db of two bits (four-halftone). The image data Db thus converted are outputted to the writing process section 30.

In the writing process section 30, the data delaying section 40 creates the data arrangement of the three pixels Dc1–Dc3 from the image data Db in the main scanning direction by use of the data delaying section 40. The image data Dc1–Dc3 (2 bits×3) are outputted to the pattern detecting section 50. In the pattern detecting section 50, whether or not the detected pattern coincides with the edge portion of the image or the specified plural patterns of the single dot line is detected Oudged). The detecting results Dd1–Dd3 are outputted to the data converting section 60. The detecting results Dd1–Dd3 are constructed with the 1-bit data Dd3 indicating whether or not the detected pattern coincides with the specified pattern and the 2-bits data; Dd1 and Dd2 representing the value of the target pixel density. The pattern detecting section 50 performs the operation of creating the 1-bit phase data Ds indicating the direction of the writing operation from the right-side position or the left-side position.

The detecting results Dd1–Dd3 are converted to the 8-bits light-emitting data De corresponding to the detection results by the data converting section 60. The writing density and the starting position of the writing on the edge portion and the single dot line portion in the image data are changed by modulating the light-emitting time period of the LD, the light-emitting power thereof, or both of them. In such the state, the writing operation on the not-shown photosensitive body is performed with 256-halftone and 600 dpi.

The control section 70 is connected to the operation board section 3 shown in FIG. 1. The control section 70 controls the reading-out process section 10, the image processing section 20, and the writing process section 30, on a basis of the mode setting at the time of reading out the original document which is set by the operation board section 3. The reading-out process section 10, the image processing section 20, and the methods of the pulse width modulation, the power modulation, and the writing position modulation are the well-known technologies. Since all of them are not the featured portion of the present invention, the explanation thereof is omitted here.

Figure 5:
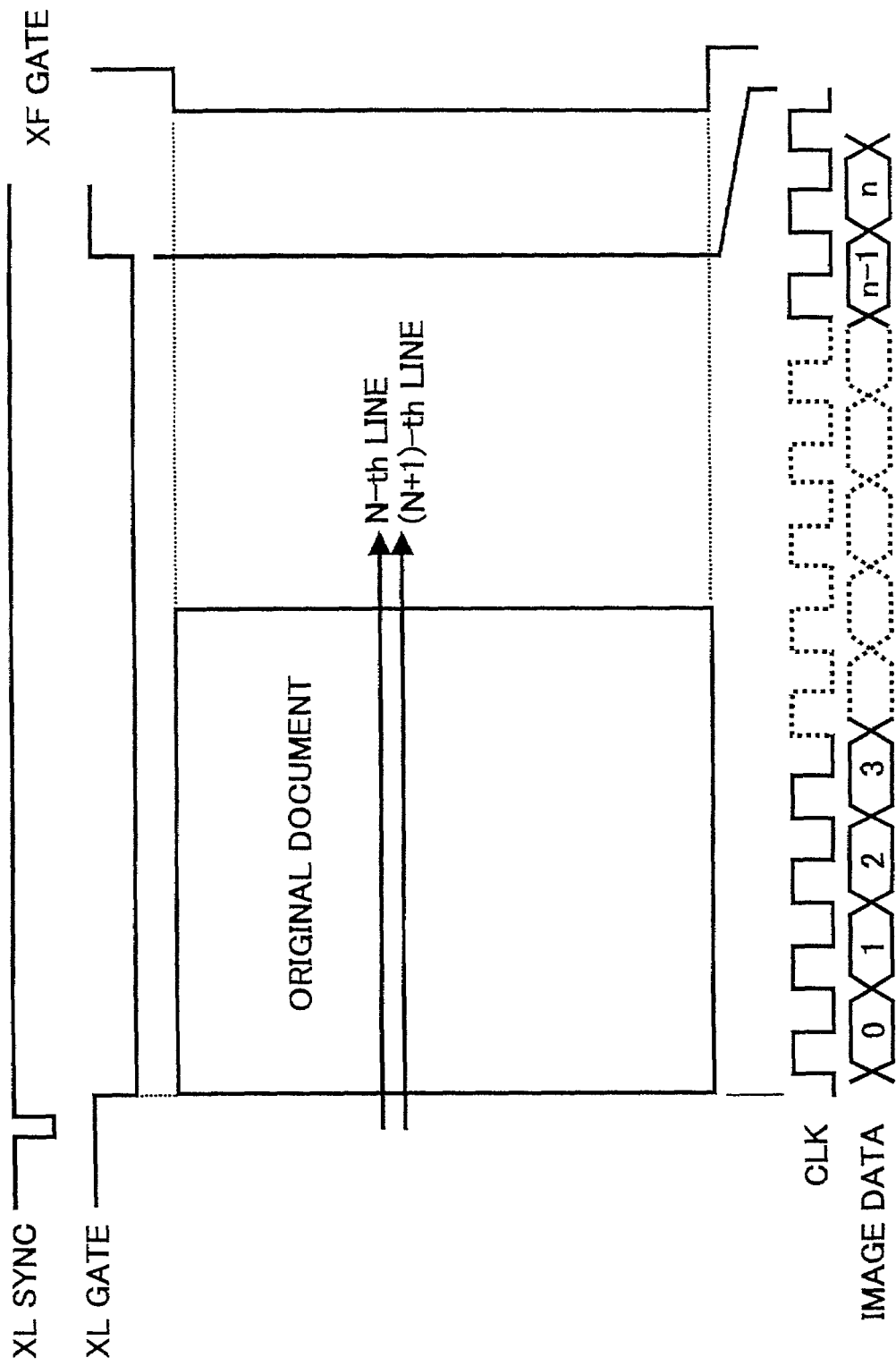
FIG. 5 is an explanatory diagram illustrating the image controlling signals.

Referring to FIG. 5, the control signal of the image is described hereinafter. The control signal includes a main scanning synchronization signal XLSYNC serving as the synchronization signal in the main scanning direction of the image, a main scanning effective period signal XLGATE representing the image effective period in the main scanning direction, a sub-scanning effective period signal XFGATE representing the image effective period in the sub-scanning direction, and a pixel clock CLK for taking the synchronization of the image data. The synchronization of the 2-bits image data Db from the image processing section 20 is taken per each one line by the main scanning synchronization signal XLSYNC. The 2-bits image data Db thus synchronized are outputted in synchronism with the pixel clock CLK during the time period when both of the sub-scanning effective period signal XFGATE and the main scanning effective period signal XLGATE are put in the state of the "L" level.

Figure 3:
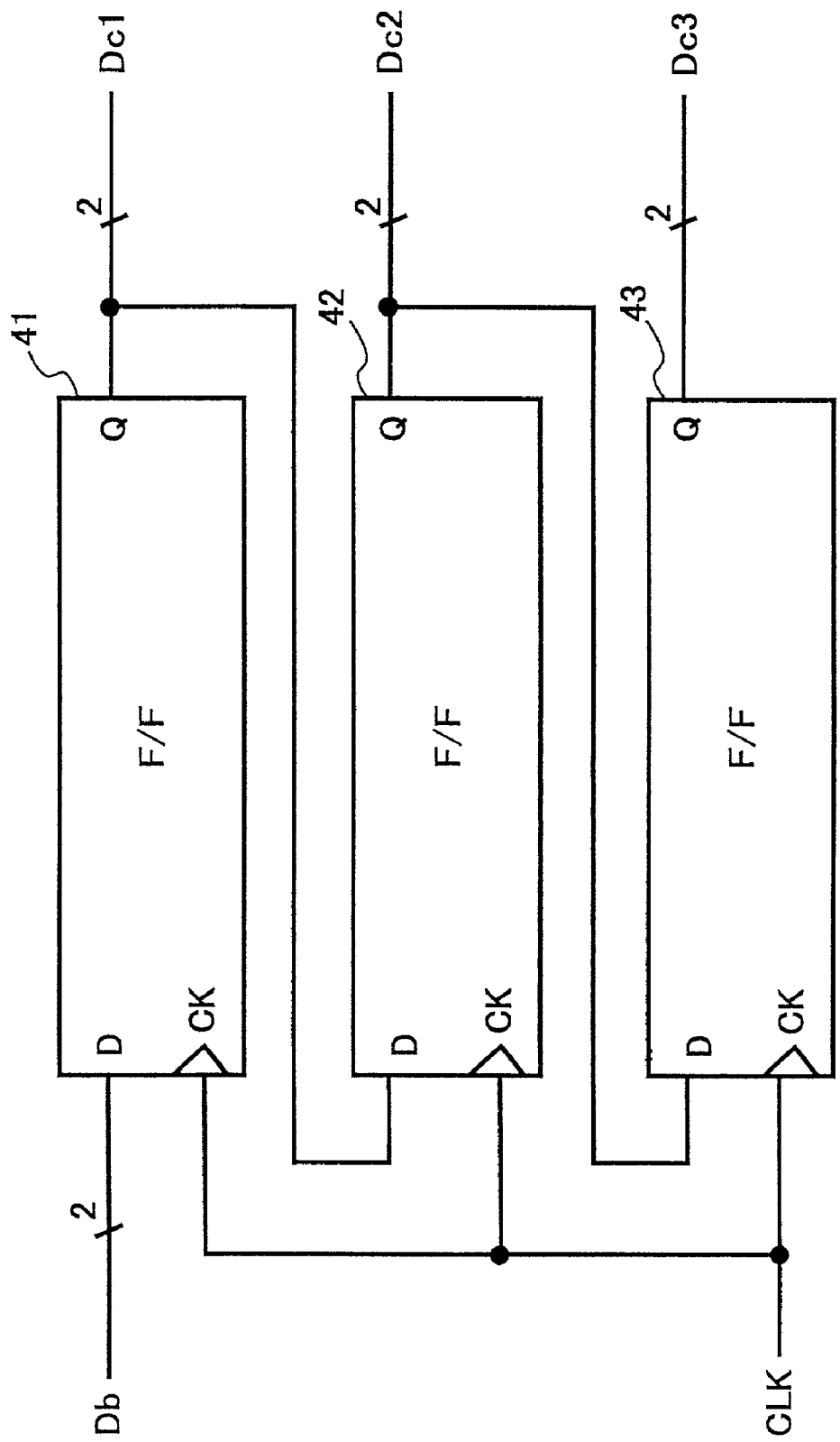
FIG. 3 is a block diagram illustrating, in detail, the data delaying section shown in FIG. 2.
Figure 4:
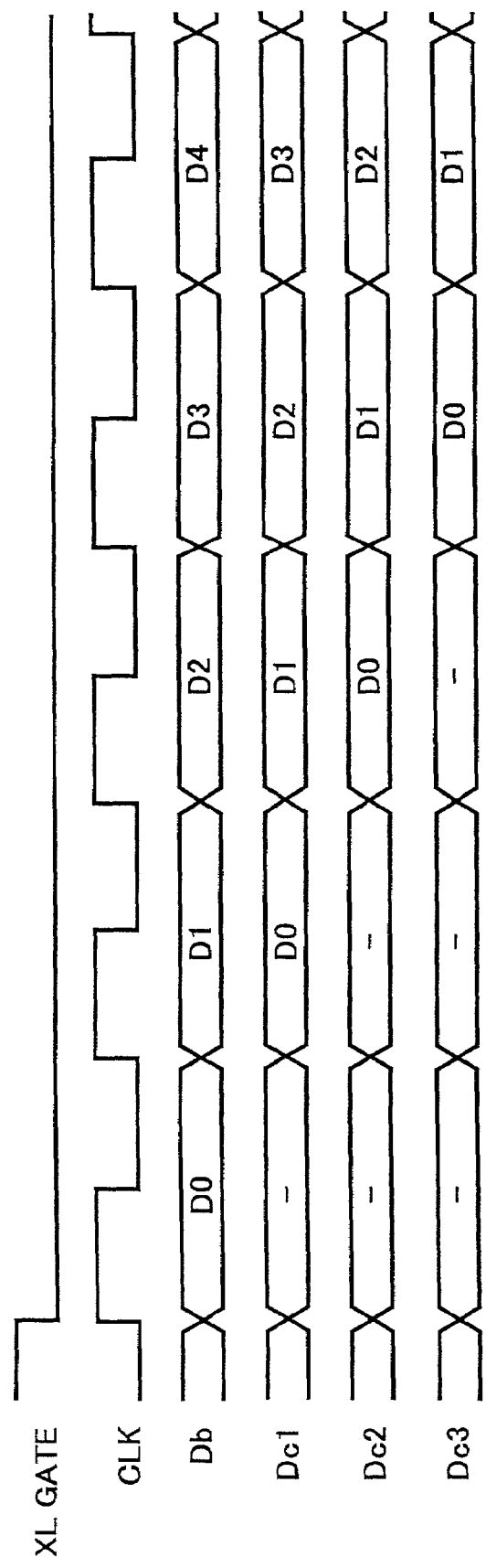
FIG. 4 is a timing chart illustrating the main signals in the data delaying section shown in FIG. 3.

Referring to FIG. 3 and FIG. 4, the data delaying section 40 is described, in detail, hereinafter. In the data delaying section 40, the data Db processed by the image processing section 20 is delayed in synchronism with the pixel clock CLK. Thereby, the data arrangements Dc1–Dc3 of the main scanning direction three pixels are created. For this reason, after performing various processes in the image processing section 20, the image data Db converted to the 2-bits (4 values) signal are inputted to FF41, the output Dc1 of FF41 becomes data created by delaying the image data Db by one pixel clock CLK. The data are further inputted to FF42 and delayed in synchronism with the pixel clock CLK. Subsequently, in the similar manner, the image data; Dc2 and Dc3 can be obtained as the outputs of FF42 and FF43.

The image data; Dc1–Dc3 of those three pixels are outputted to the pattern detecting section 50. In the pattern detecting section 50, the edge portion of the lengthwise line having the width of 2 or more dots from the pixel position shown by the mark "·" or the lengthwise single dot line is detected. At this time, the pixel Dc2 becomes the target pixel, and the pixels Dc1 and Dc3 become the circumferential pixels.

Figure 6A:
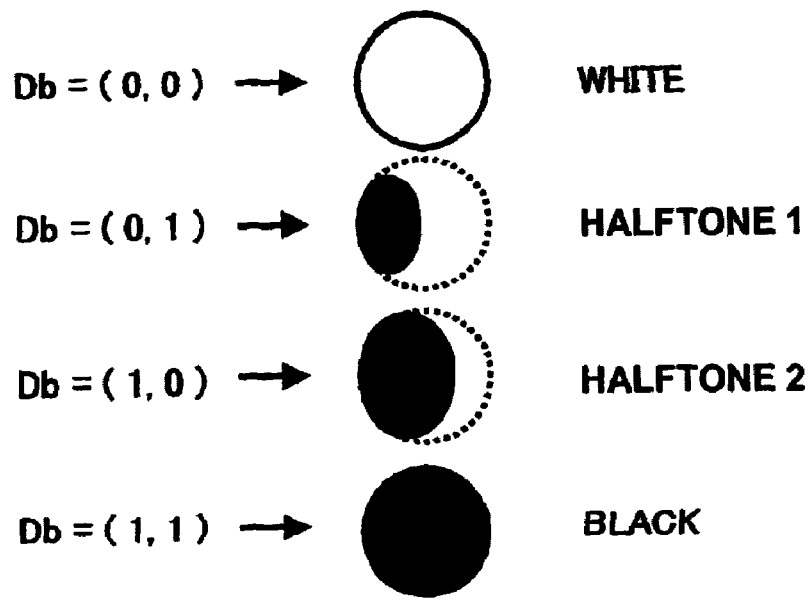
FIGS. 6A and 6B are explanatory diagrams respectively illustrating the relationship between the two-bits density data and the printing dots and the relationship between the phase data and the printing positions.

Since the image data Db processed by the image processing section 20 are of 2-bits, 4 steps can be taken as the density. As to the relationship between the density data and the actual image (printing dots) can be represented by the 2-bits combination as follows, as shown in FIG. 6A:

(1) Density Data Db=(0,0), Actual Image: White;
(2) Density Data Db=(0,1), Actual Image: Halftone 1;

(3) Density Data Db=(1,0), Actual Image: Halftone 2 (i.e., the density of the halftone 2 is higher than that of the halftone 1);

(4) Density Data Db=(1,1), Actual Image: Black

Here, as to the combination of Dc1–Dc3, since the respective dots can take four states, the 64 states (4×4×4=64) can be realized. In such situation, when, recognizing all of those states, those states are converted to the light-emitting data by use of the data converting section 60 mentioned later and compensated thereafter, it is necessary to prepare the 64×8-bits conversion table. Therefore, the scale of the hardware may become further large.

In such the situation, as shown in FIG. 7 according to the present invention, the actual images (printing dots) are detected as the patterns, only when the circumferential pixels Dc1 and Dc3 are of white (0,0) or black (1,1) and the target pixel Dc2 is of halftones (0,1) and (1,0) or black (1,1). Here, the meanings of the respective patterns are described below. At first, the three patterns Dp1–Dp3 represent the lengthwise lines (lengthwise lines of black) having the single dot width, wherein, {Dc1, Dc2, Dc3}=(0, 0, 1, 1, 0, 0),=(0, 0, 1, 0, 0, 0),=(0, 0, 0, 1, 0, 0).

The difference therebetween is only the thickness of the lines; (1, 1), (1, 0), and (0, 1).

Furthermore, the six patterns Dp4–Dp9 correspond to the end portions of the lengthwise lines, etc., the width of which is divided into more than two pixels in the main scanning direction, wherein, Dp4=(1, 1, 1, 1, 0, 0),
Dp5=(0, 0, 1, 1, 1, 1),
Dp6=(1, 1, 1, 0, 0, 0),
Dp7=(0, 0, 1, 0, 1, 1),
Dp8=(1, 1, 0, 1, 0, 0),
Dp9=(0, 0, 0, 1, 1, 1), The patterns are respectively different from each other in accordance with the left end or the right end of the image and the thickness of the lines arranged in parallel at the end portion thereof.

The two patterns Dp10 and Dp11 correspond to the white lengthwise line having the width less than a single dot, wherein, Dp10=(1, 1, 1, 0, 1, 1),
Dp11=(1, 1, 0, 1, 1, 1).

The remaining four patterns do not correspond to the above-mentioned eleven patterns Dp1–Dp11. Those patterns differ from each other in accordance with the density of the respective target pixels to be noted. When the signals Dp1–Dp11 shown in the right side of the respective patterns coincide with those signals, the value thereof becomes "1".

The detection patterns are further described. The present invention shows the case that the circumferential pixels Dc1 and Dc3 are white (0, 0) or black (1, 1) and the target pixel Dc2 is halftones (0, 1) and (1, 0) or black (1, 1), and the compensation is done only if necessary. Namely, if the target pixel Dc2 is white (0, 0) initially, the data cannot be further reduced. Therefore, the target pixel Dc2 is compensated for the halftones (0, 1) and (1, 0) or the black (1, 1).

To state the reason why the circumferential pixels Dc1 and Dc3 is compensated for white (0, 0) or black (1, 1), since the data without the phase information is employed as the input data, in the case of the halftones (0, 1) and (1, 0), it is indefinite whether or not the data should be shifted rightward or leftward essentially. Therefore, when the target pixel Dc2 and one of the circumferential pixels Dc1 and Dc3 are both the halftones (0, 1) and (1, 0), it is indefinite whether or not the two halftone data are shifted to each other and printed or the halftone data are separated from each other and printed. The troublesome matter may happen due to the compensation on some occasions. On the other hand, if the circumferential pixels Dc1 and Dc3 are limited to white (0, 0) or black (1, 1), the phase information is printed or not printed with full duty regardless thereof. Mainly taking the character manuscript into consideration, on many occasions, the halftone pixel comes to the position adjacent to the black pixel when the pixel is the left-end and right-end portions of the image. Owing to such the compensation, the reproducibility can be improved.

The outputs Dd1–Dd3 of the pattern detecting section add the bit Dd3 showing whether or not the pattern coincides with the specified pattern to the target pixel data Dd1 and Dd2 as "1", when either one among the signals Dp1–Dp11 showing whether or not the outputs coincide with the respective patterns becomes "1". When the output does not coincide with the specified pattern, the bit Dd3 is created as "0" by adding the bit data to the target pixel data Dd1 and Dd2. As the result, since the conversion table is required only for the eight states, the amount of the data becomes ⅛ compared with the case of not performing the pattern matching.

Figure 6B:
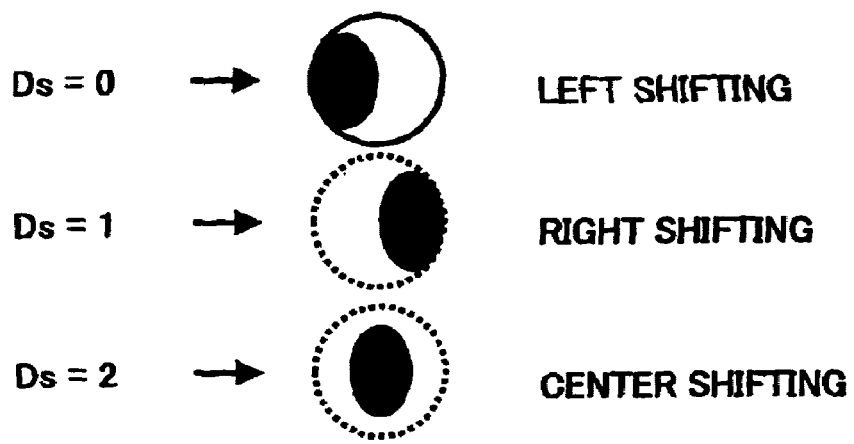

The phase data Ds of one bit are created in accordance with the existence of the black pixels at the right side or at the left side. The data are set to the left shifting (Ds=0) usually. When the black pixel is located at the right side, the data are set to the right shifting (Ds=1). Thereby, the image of further good printing quality can be obtained at the left end portion and the right end portion of the image. When the "center" can be selected by the light-emitting timing control although that is not applied to the present embodiment, the image of good printing quality can be obtained by creating the "center" (on this occasion, the phase data Ds are 2 bits.) at the time of detecting a single dot line. The relationship between the phase data Ds and the printing position is shown in FIG. 6B.

Figure 8:
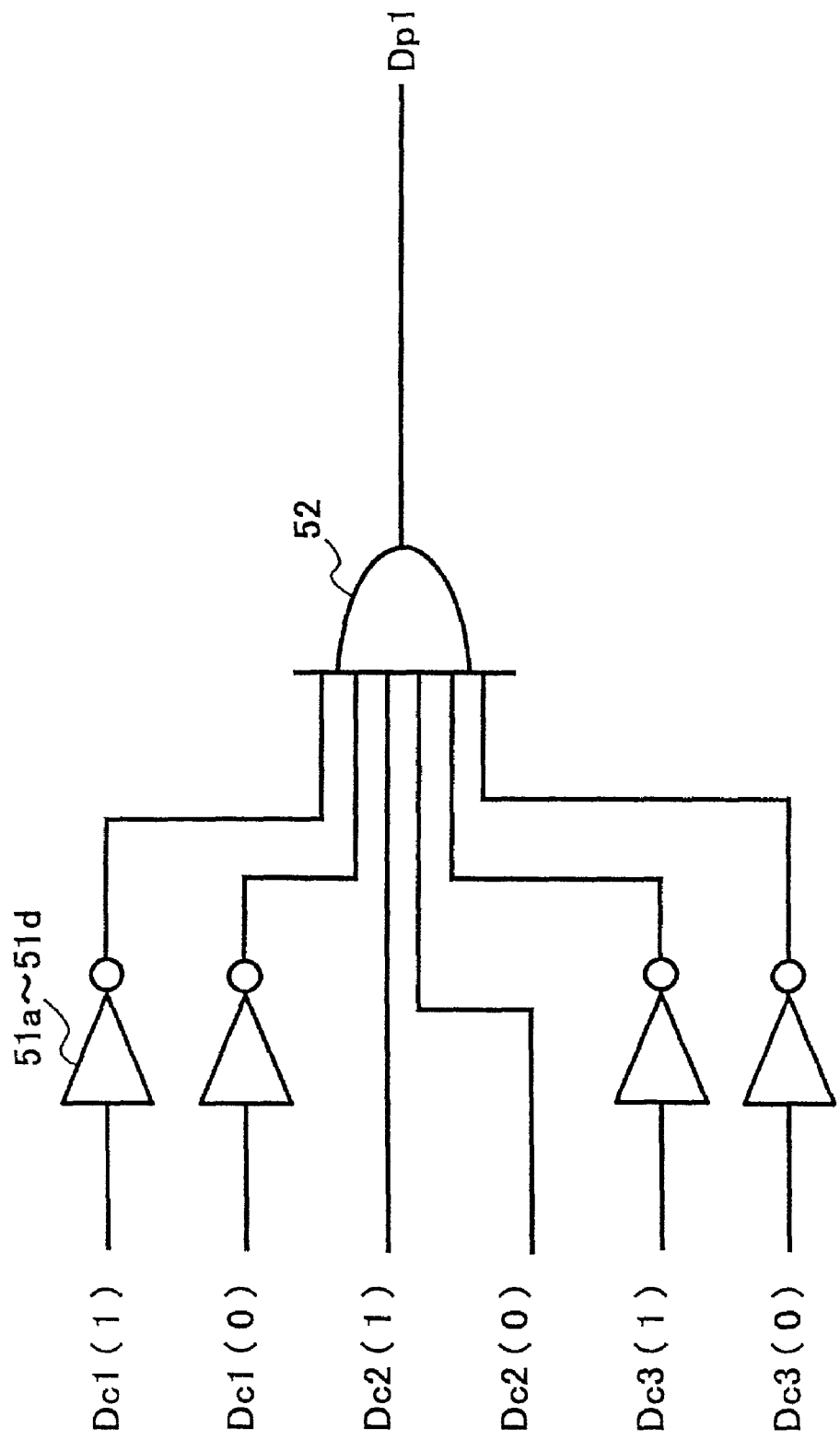
FIG. 8 is a block diagram illustrating, in detail, the pattern detecting section shown in FIG. 2.

Next, the operation of the pattern detecting section 50 is described, referring to FIG. 8. In the pattern detecting section 50, the three-pixels 6-bits data arrangements Dc1–Dc3 obtained by delaying in the main scanning direction by the data delaying section 40 add the bit Dd3 corresponding to whether or not the data coincide with the pattern shown in FIG. 7 to the target pixel data Dd1 and Dd2, and thereby the detection results Dd1–Dd3 are created and the phase data Ds are created. Furthermore, the pattern employed for the pattern detection is selected by the control section 70.

In the pattern detecting section 50, the pattern matching of the outputs Dc1–Dc3 from the data delaying section 40 is performed by the combination of the inversion (INV) gate, the logical product (AND) gate, and the logical sum (OR) gate, etc.

Figure 9:
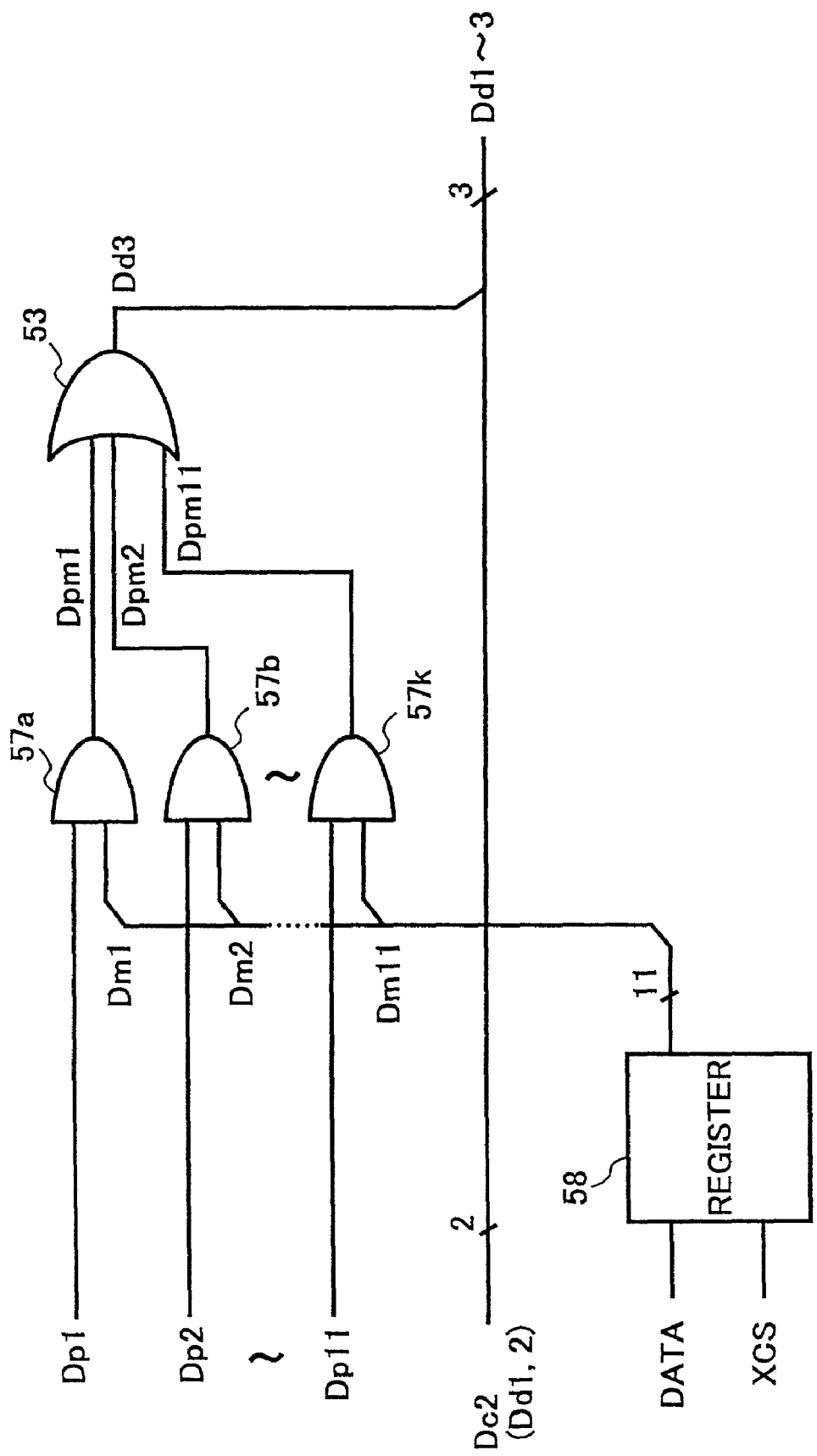
FIG. 9 is a block diagram, in detail, the pattern selecting section of the pattern detecting section shown in FIG. 2.

FIG. 9 shows the matching circuit for the bit pattern Dp1 in the case of:

{Dc1, Dc2, Dc3}=(0, 0, 1, 1, 0, 0).

The respective bits Dc1 (1) and (0) and the respective bits Dc3 (1) and (0) are respectively inverted by INV 51a–51d, and the respective bits thus inverted coincide with (0, 0, 1, 1, 0, 0). On that occasion, all outputs of the INV 51a–51d become "1", and the output Dp1 of the AND gate 52, to which the outputs of the INV 51a–51d and the respective bits Dc2 (1) and (0) are inputted, becomes "1". When the bit data are matched to the respective patterns in such the way, the detection signals Dp1–Dp11 corresponding thereto respectively become "1".

Figure 10:
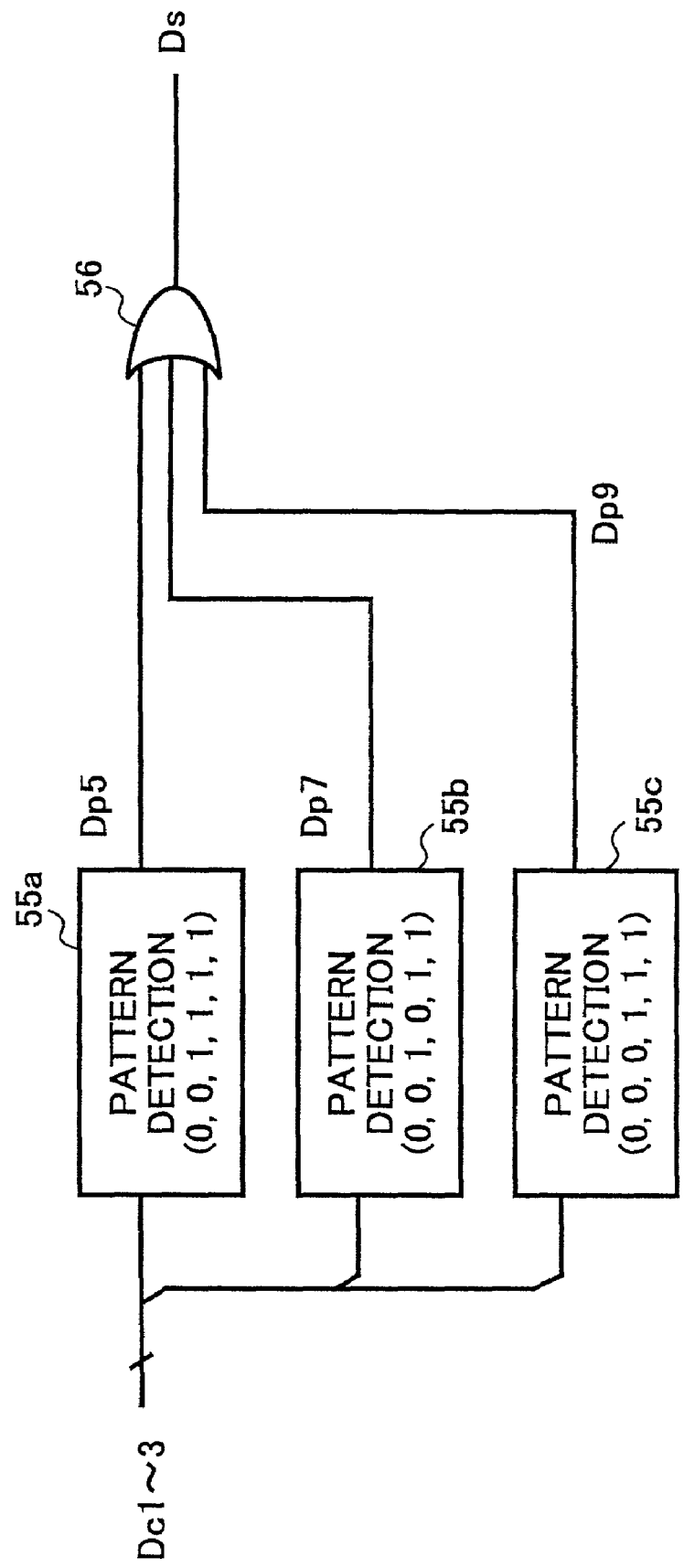
FIG. 10 is a block diagram illustrating, in detail, the phase data generating section of the pattern detecting section shown in FIG. 2.

Next, the selection of the pattern is described. As shown in FIG. 10, the pattern selection realizes whether or not the patterns Dp1–Dp11 are selected or not selected, by setting the usage pattern selecting data Dm1–Dm11 showing whether or not the patterns Dp1–Dp11 are employed or not employed for the 11-bits register 58 capable of accessing by the action of the control section 70, and by forcibly masking the result of the respective patterns detection by use of the AND gates 57a–57k regardless of the result thereof.

Namely, the control section 70 accesses the register 58 and thereby the signal XCS is asserted. The usage pattern selecting data Dm1–Dm11 are written in the register 58 and held therein. The outputs Dm1–Dm11 of 11 bits from the register 58 correspond to the eleven detection patterns Dp1–Dp11 respectively shown in FIG. 7. When "0" is written therein, the output becomes "L". Consequently, the outputs Ddm1–Ddm11 of the corresponding AND 57a–57k become "L", regardless of the result of the pattern detection. For this reason, it may become possible that, even though the bit data are matched to the patterns Dp1–Dp11, the data are not the ones to be compensated.

Since either one of the signals Dp1–Dp11 showing the coincidence with the respective patterns becomes "1" in the case of coinciding with the specified pattern, if this pattern is selected, the output Dd3 of the OR gate 53, to which Dpm1–Dpm11 are inputted, becomes "1", as shown in FIG. 9. In contrast, when the coinciding pattern does not exist, or when, even though the coinciding pattern exists, the pattern is not selected, since the signals Dpm1–Dpm11 become "0", the output Dd3 of the OR gate 53 becomes "0". And then, the signals Dd1–Dd3 of the detection result are created by respectively equalizing the respective bits Dc2 (1) and (0) of the target pixel data Dc2 to Dd2 and Dd1.

The phase data Ds are created by the output signal (on this occasion, the patterns; Dp5, Dp7, and Dp9) of the pattern detecting circuits; 55a, 55b, and 55c in relation to the pattern for selectively equalizing to "1" and shifting rightward, wherein, as to the phase data Ds, as shown in FIG. 10 for example, Dp5=(0, 0, 1, 1, 1, 1),
Dp7=(0, 0, 1, 0, 1, 1),
Dp9=(0, 0, 0, 1, 1, 1).

When those signals are inputted to the OR gate 56 and the logical sum (OR) is taken for the signals and thereby the signals coincide with the patterns desired to be shifted rightward, the phase data Ds become "1". In contrast, when the signals do not coincide with the patterns desired to be shifted rightward, the phase data Ds become "0". The pattern for creating the phase data Ds is made effective regardless of whether those pattern is employed as the detection pattern for compensating the density. The reason thereof is that, even though the density compensation is not performed, the printing operation is performed as the rightward shifting or the leftward shifting on a basis of the phase data, and thereby the reproducibility of the image can be improved.

Figure 11:
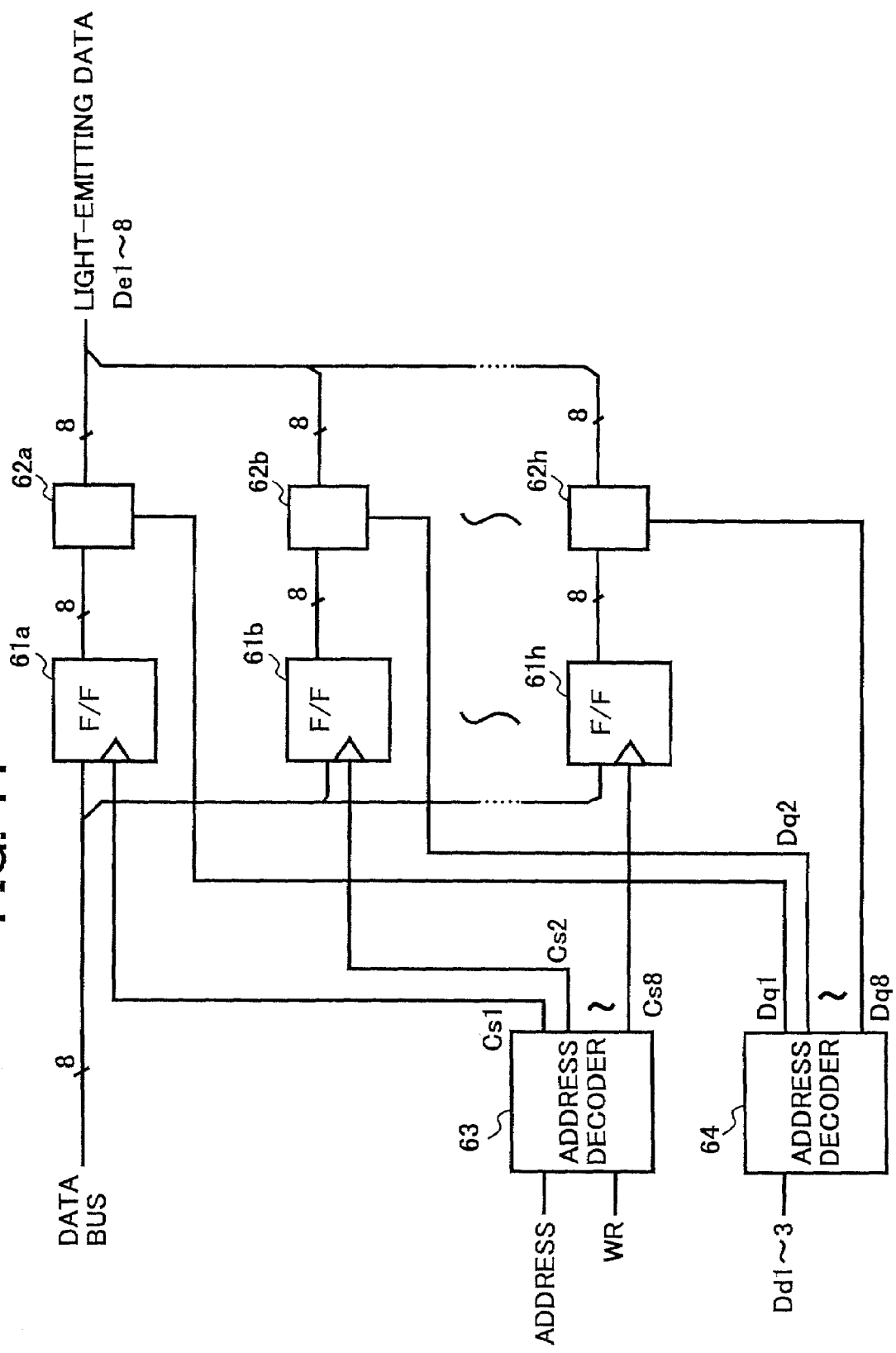
FIG. 11 is a block diagram illustrating, in detail, the data converting section shown in FIG. 2.
Figure 14:
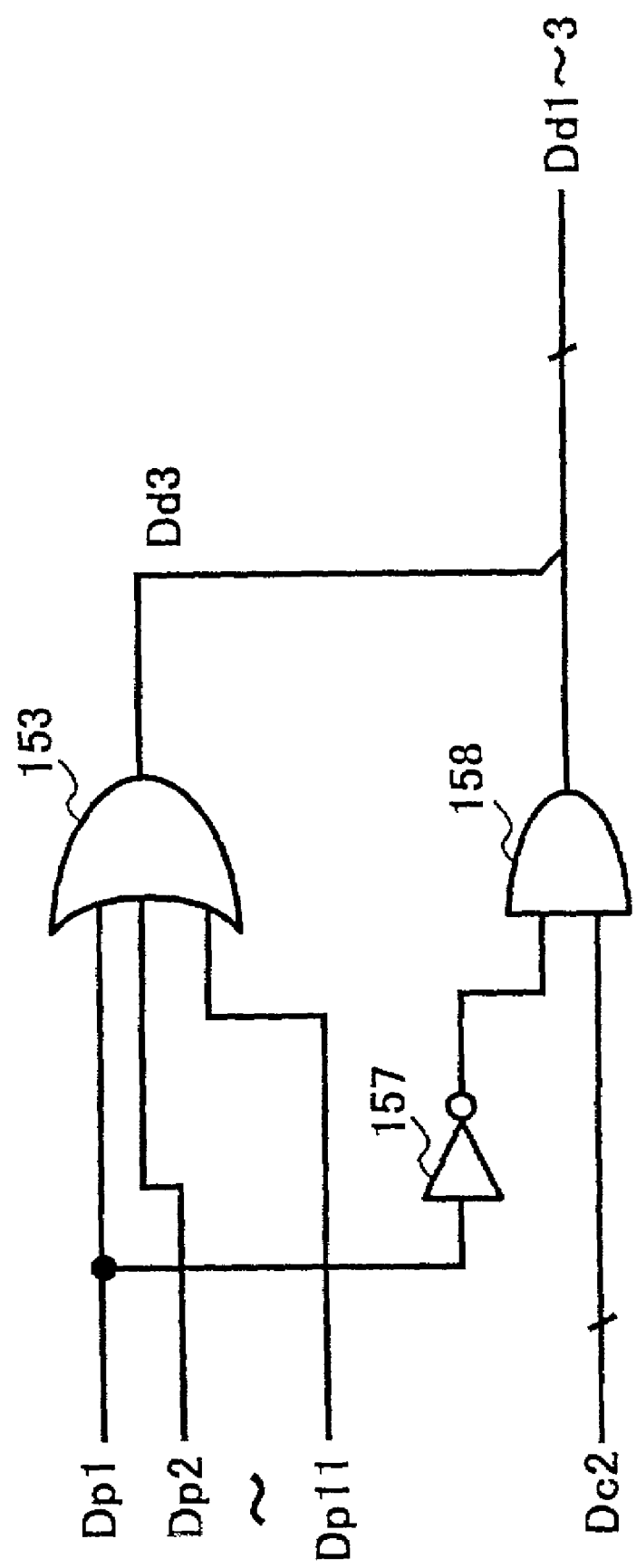
FIG. 14 is a block diagram illustrating the main part of the pattern detecting section in the second embodiment of the image forming apparatus according to the present invention.

Next, the data converting section 60 is described, referring to FIG. 11. In order to convert the data to the light-emitting data De1–De8 for actually performing the modulation on a basis of the signals Dd1–Dd3 detected by the pattern detecting section 50, the data converting section 60 is composed of FF61a–61h and three-states buffers 62a–62h both connected to the data bus of the control section 70, and the address decoders 63 and 64. In such the construction, the light-emitting data De1–De8 at the conversion side can be freely set by the control section 70.

To state further in detail, in the FF61a–61h, one address is allocated thereto, and the address bus of the control section 70 is decoded by the address decoder 63. The decoded signal and the writing signal WR from the control section 70 take the logical sum (AND) and thereby the writing operation is done by the control section 70 for the respective FF61a–61h. At this time, the chip selecting signal for the FF performing the data-writing among the chip selecting signals Cs1–Cs8 corresponding to the respective FF61a–61h becomes "1".

The data bus of the control section 70 is connected to the data input terminal of the FF61a–61h. The chip selecting signals Cs1–Cs8 are respectively inputted to the clock terminals of the FF61a–61h, and thereby the light-emitting data De1–De8 set by the control section 70 are written therein. And then, the detection signals Dd1–Dd3 detected by the pattern detecting section 50 are decoded by the address decoder 64. The outputs Dq1–Dq8 thereof are employed as the output enabling signal of the respective 3-states buffers 62a–62h, and thereby the light-emitting data De1–De8 can be changed over in accordance with the coincidence or non-coincidence with the specified pattern and the initial density of the target pixel. The light-emitting amount of the LD and the light-emitting starting position are controlled with the modulating method, such as the pulse width modulation, the power modulation, or both of them, on a basis of the light-emitting data De1–De8 respectively set by the data converting section 60 in accordance with the detection results Dd1–Dd3 and the phase data Ds detected by the pulse detecting section 50.

The actual image is described, referring to FIG. 12. FIG. 12 shows the lengthwise line and the transverse line both of single dot width (crossing lines). In the case of the black line of single dot width, the input image as shown in FIG. 12A is converted to the 2-bits data Db as shown in FIG. 12B by the image processing section 20. When the 2-bits data Db is black (1, 1), if the light-emitting data De1–De8 are set to the maximum value 255 of 8 bits, the beam diameter becomes larger than the one pixel such that, usually, the large black portion is surely buried. Consequently, initially, the copied line is apt to be thicker than the line on the original document. Furthermore, even though the light-emitting data De are same, the lengthwise line is apt to become thicker than the transverse line as the electrophotographic property when both of the lengthwise and transverse lines are outputted as the copied image. As the result, the output image may become as shown in FIG. 12C.

The pixel corresponding to the lengthwise pattern of single dot width is detected by the pattern detecting section 50. The above pattern of single dot width is:

(0, 0, 1, 1, 0, 0),
(0, 0, 1, 0, 0, 0),
or
(0, 0, 0, 1, 0, 0).

The light-emitting data De for that pixel are decreased to the extent; 70–90% of the amount (intensity) of the light to be usually emitted, and the light is emitted with the pulse width modulation. Thereby, the beam diameter can be made longer in a lengthwise direction than usual. Consequently, the lengthwise line can be made fine. As the result, the image outputted as the copied one can be made of same extent as that of the actual original document as shown in FIG. 12D, and the reproducibility thereof can be improved. Furthermore, any influence is not exerted on the portion excluding the lengthwise line.

As to the white lengthwise line of less than a single dot width, the black is replaced by the white in FIG. 12.

The pattern detecting section 50 detects the patterns:

(1, 1, 1, 0, 1, 1),
(1, 1, 0, 1, 1, 1).

The density of the target pixel is decreased in the same way and the white line is made thick. Thereby, the collapse of the white line having less than a single dot width can be prevented.

Regarding the right and left ends of the image, in addition to the problem same as that of the single dot line, other problem may happen. Namely, as shown in FIGS. 13A–13C, when two data to be reproduced in the contacting state essentially as one line are converted to the data not having the phase information and written thereon, the light emitting timing is fixed on the right, left, or center. In such the state, when the timing is fixed on the left, the line is divided undesirably at the left end of the image when the timing is fixed on the right, the line is also divided undesirably at the right end of the image. If the density of the halftone portions is low and the interval therebetween is wide, the divided portions are outputted in the divided form. In contrast, if the density of the halftone portions is high and the interval therebetween is narrow, the space between the halftone is buried and the line becomes thick. Both occasions cause the reason of damaging the reproducibility.

In the pattern detecting section 50, the pixels corresponding to the patterns showing the left and right ends of the image are detected. Those pixels are:

(1, 1, 1, 1, 0, 0),
(1, 1, 1, 0, 0, 0),
(0, 0, 1, 0, 1, 1),
(1, 1, 0, 1, 0, 0),
(0, 0, 0, 1, 1, 1).

The density compensation is performed by the data converting section 60, such that the density is made lower than the normal density. Thereby, the tendency that the copied line is apt to become thicker than that of the original document and the difference in thickness of the lengthwise line and the transverse line can be respectively compensated. Furthermore, the pixel corresponding to the leading tip end is shifted rightward and the pixel corresponding to the rear tip end is shifted leftward in accordance with the phase data created by the pattern detecting section 50. In such the state, the printing operation is done. Consequently, the reproducibility can be further improved.

Here, the image quality can be basically improved, utilizing such the compensation. However, when the outputting state of the image differs due to the unevenness between the machines, if all of the patterns are always made valid, since the code data creating method includes only the step of adding the bit Dp3 on whether or not the compensation is done or not done for the target pixel to the target pixel, the same compensation is done uniformly when the density of the target pixel is same in the case if performing the compensation. Consequently, in contrast therewith, the troublesome matters may occur on some occasions.

For instance, the pattern showing the left-edge portion of the image (0, 0, 0, 1, 1, 1) and the pattern showing the fine lengthwise line of single dot width (0, 0, 0, 1, 0, 0) are compensated to the same value. However, in the case of the electrophotography, the single dot line is apt to be more faintly outputted than the plural dot line, from the beginning. Therefore, when the lengthwise line is relevant to the fine lengthwise line of single dot width (0, 0, 0, 1, 0, 0), it can be thought that the density thereof is lowered (too much) by the compensation and thereby the density conversely becomes too faint next time, and the line is apt to be broken off (interrupted) on some occasions.

In contrast, it can be also thought that, by increasing the compensation bits, the weighting of the compensation is changed. However, the hardware in the data converting portion may become considerably large-scaled. Therefore, such the step is not favorable countermeasure. Here, whether or not the plural pattern for use in the pattern matching is actually employed or not employed can be selected, and the specified pattern renders not to be used in the pattern matching. In such the structure, it is possible to simply cope with the unevenness between the machines almost without increasing the hardware load.

Second Embodiment

In the above-mentioned first embodiment of the present invention, the 3-bits code data (Dd3, Dd2, Dd1) are constructed with the 1-bit data Dd8 representing the coincidence with either one of the patterns Dp1–Dp11 and the 2-bits data Dd2 and Dd1 representing the value of the density of the target pixel. Furthermore, as shown in FIG. 7, there is no white (0, 0) in the 2-bits data Dd2 and Dd1 of the target pixel in the patterns Dp1–Dp11. Consequently, in the case of coinciding with either one of the patterns Dp1–Dp11, the data (Dd3, Dd2, Dd1) become (1, 1, 1) when the target pixel is the black (1, 1), and the same data (Dd3, Dd2, Dd1) respectively become (1, 1, 0) and (1, 0, 1) when the target pixel is the halftones (1, 0) and (0, 1). The only three cases of the above data exist. The other case of the data (1, 0, 0) does not exist. Moreover, in the case of non-coincidence with all of the patterns Dp1–Dp11:

(Dd3, Dd2, Dd1)=(0, X, x).

Here, in the second embodiment, the code (Dd3, Dd2, Dd1)=(1, 0, 0) is employed as the code data of the pattern Dp1=(0, 0, 1, 1, 0, 0). The first embodiment of the pattern detecting section shown in FIG. 9 is replaced by the second embodiment of the same section shown in FIG. 14. The pattern detecting signals Dp1–Dp11 are applied to the OR gate 153.

The output Dd3 of the OR gate 153 becomes equal to 1 (Dd3=1) when the data coincide with either one of the eleven patterns Dp1–Dp11 as shown in FIG. 7. The pattern detecting signal Dp1 is applied to the one-side input terminal of the AND gate 158 through the inverter 157, and the target pixel data Dc2 are applied to the other-side input terminal of the AND gate 158. Consequently, the output (Dd2, Dd1) of the AND gate 158 becomes (0, 0) when the pattern Dp1 is equal to 1 (Dp1=1). The target pixel data (Dc2, Dc1) are outputted as they are when the pattern Dp1 is not equal to 1 (Dp1·1).

According to the second embodiment of the present invention, the code data (1, 0, 0) independent from the other patterns Dp2–Dp11 is allocated to the specially important single dot line (0, 0, 1, 1, 0, 0) among the eleven patterns Dp1–Dp11 as shown in FIG. 7.

Consequently, the density thereof can be adjusted independently from the others.

As is apparent from the foregoing description, according to the first aspect of the present invention, since the lengthwise line of at least single dot width is detected on a basis of the pattern of the respective multi-value data of the target pixel and the circumferential pixels adjacent thereto in the main scanning direction thereof, and the printing operation is done in the state of making small the printing dot of the lengthwise line, the black line of the single dot width can be prevented from becoming too thick for the multi-value image. In addition, the thickness of the lengthwise line can be equalized to that of the transverse line.

According to the second aspect of the present invention, since the edge of the lengthwise line of the plural dots adjacent to each other in the main scanning direction is detected on a basis of the pattern of the respective multi-value data of the target pixel and the circumferential pixel adjacent thereto in the main scanning direction thereof, and the printing operation is done in the state of making small the printing dot of the lengthwise line stretching over the plural pixels adjacent to each other in the main scanning direction, the edge portion of the lengthwise line of the plural dot width can be prevented form becoming too thick for the multi-value image. In addition, the thickness of the lengthwise line can be equalized to that of the transverse line.

According to the third aspect of the present invention, since the edge is judged to be the edge of the lengthwise line of the single dot width or the lengthwise line of the plural dot width assuming that the pixels situated at just right and left sides of the target pixel are white or black and the target pixel is halftone or black, the number of the patterns to be detected can be reduced and the structure of the hardware can be simplified. Furthermore, the occurrence of the abnormal image due to the performing of the unnecessary compensation can be prevented.

According to the fourth aspect of the present invention, since the width is made closer so as to bring the adjacent dots into contact with each other when the printing operation is done in the state of making small the printing dot of the lengthwise line of the plural dot width, even though the printing dot is made small, the occurrence of the abnormal image can be prevented.

According to the fifth aspect of the present invention, since the white lengthwise line of the less than single dot width is detected on a basis of the pattern of the target pixel and the circumferential pixels adjacent thereto in the main scanning direction, and the printing operation is done in the state of making small the printing dot of the white lengthwise line, the white line of the less than single dot width can be prevented from collapse (being crushed). In addition, the thickness of the lengthwise line can be equalized to that of the transverse line.

According to the sixth aspect of the present invention, since either one of the pattern detecting devices for detecting the plural different patterns can be selectively operated, the unnecessary compensation can be skipped when the compensation is not required for some of the patterns due to the factor such as the difference of the developing condition.

According to the seventh aspect of the present invention, since code data including data representing coincidence or non-coincidence with the plural patterns and density data of the target pixel is created, the data obtained by decoding the code data are converted to the light-emitting data, and thereby the size of the printing dot is changed, it is possible to prevent the troublesome matters; that the edge portion of the line of the plural dot width and/or the black line of the single dot width may become too thick, that the white line of the less than single dot width collapses (is crushed), and that the thickness of the lengthwise line differs from that of the transverse line.

According to the eighth aspect of the present invention, since the code data including the data representing the coincidence or non-coincidence with the plural pattern and the density data of the target pixel are created, the specified code data are created in the case of coinciding with the specified pattern among the aforementioned plural patterns, the data obtained by decoding the code data are converted to the light-emitting data, and thereby the size of the printing dot is changed, the same functional effect as that of the seventh aspect of the present invention.

The present invention can thus be used in an image forming apparatus including a laser-based writing optical system and detects a specified pattern in an image (i.e., an edge portion of the image, single dot line) using pattern matching from multiple data not including phase data and controls timing of light emission by making fine a portion of a pattern and adding the phase data for controlling the timing of the light emission. With the image forming apparatus, method and computer program product, according to the present invention, it is possible to prevent a phenomena that an edge portion of a line having a plural dot width and a black line of a single dot width tend to become too thick for a multi-value image, that a white line of a single dot width is crushed, and that thickness of lengthwise and transverse lines differ from each other. The pattern detecting section detects whether a line is a lengthwise line of a single dot width, whether an edge is a lengthwise line having a plural dot width, and whether a line is a white lengthwise line of a single one width, on a basis of respective patterns of multi-value data of a target pixel and circumferential pixels adjacent thereto in a main scanning direction. The data converting section converts the detected data to light-emitting data so as to reduce a printed dot diameter of a lengthwise line.

The mechanisms and processes set forth in the present invention may be implemented using one or more conventional general purpose microprocessors and/or signal processors programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits, by interconnecting an appropriate network of conventional component circuits or by a combination thereof with one or more conventional general purpose microprocessors and/or signal processors programmed accordingly.

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

The preferred embodiments of the present invention (the first through eighth aspects) have been described heretofore. However, numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus, comprising:
a pattern detecting device configured to detect whether or not a pattern is constructed with a lengthwise line of a single dot width on a basis of a pattern of respective multi-value data of a target pixel and circumferential pixels adjacent thereto in a main scanning direction; and a printing device configured to print size-reduced printing dots of said lengthwise line of the single dot width detected by said pattern detecting device.

2. The image forming apparatus of claim 1, wherein said pattern detecting device further detects whether or not the pattern is constructed with an edge of a lengthwise line of a plural dot width on a basis of the pattern of the respective multi-value data of the target pixel and the circumferential pixels adjacent thereto in the main scanning direction; and said printing device further prints size-reduced printing dots of said lengthwise line of the plural dot width detected by said pattern detecting device.

3. The image forming apparatus of claim 2, wherein said pattern detecting device judges whether or not said constructed lengthwise line is of the single dot width or of a plural dot width, when pixels neighboring right and left of the target pixel are white or black and the target pixel is halftone or black.

4. The image forming apparatus of claim 2, wherein said printing device shortens a dot width so as to bring neighboring dots into contact with each other when printing is done with the size-reduced printing dot of the lengthwise line of the plural dot width.

5. The image forming apparatus of claim 3, wherein said printing device shortens a dot width so as to bring neighboring dots into contact with each other when printing is done with the size-reduced printing dot of the lengthwise line of the plural dot width.

6. The image forming apparatus as defined in one of claims 1 through 4, wherein said pattern detecting device further detects whether or not said lengthwise line is a white lengthwise line of a single dot width or less than the single dot width, on a basis of the patterns of the respective multi-value data of the target pixel and the circumferential pixels adjacent thereto in the main scanning direction; and said printing device performs the printing operation with further small printing dot of the white lengthwise line detected by said pattern detecting device.

7. The image forming apparatus as defined in one of claims 1 through 5, wherein said pattern detecting device is provided with plural pattern detecting sections for detecting different patterns; and one of said plural pattern detecting sections to be operated can be selected.

8. The image forming apparatus as defined in one of claims 1 through 5, wherein said pattern detecting device and said printing device create code data including data representing whether or not the data coincide with plural patterns and density data of the target pixel; and the size of the printing dot is changed by converting the data obtained by decoding the code data to the light-emitting data.

9. The image forming apparatus as defined in one of claims 1 through 5, wherein said pattern detecting device and said printing device generate code data including data representing coincidence or non-coincidence with the plural patterns and density data of the target pixel;

the specified code data are generated in the case of coinciding with the specified pattern among the plural patterns; and the data obtained by decoding the code data are converted to the light-emitting data and thereby the size of the printing dot is changed.

10. An image forming apparatus, comprising:

pattern detecting means for detecting whether or not a pattern is constructed with a lengthwise line of a single dot width on a basis of a pattern of respective multi-value data of a target pixel and circumferential pixels adjacent thereto in a main scanning direction; and printing means for printing size-reduced printing dots of said lengthwise line of the single dot width detected by said pattern detecting means.

11. The image forming apparatus of claim 10, wherein said pattern detecting means further detects whether or not the pattern is constructed with the edge of said lengthwise line of the plural dot width on a basis of the pattern of the respective multi-value data of the target pixel and the circumferential pixels adjacent thereto in the main scanning direction; and said printing means further prints size-reduced printing dots of said lengthwise line of the plural dot width detected by said pattern detecting means.

12. The image forming apparatus of claim 11, wherein said pattern detecting means judges whether or not said constructed lengthwise line is of the single dot width or of a plural dot width, when pixels neighboring right and left of the target pixel are white or black and the target pixel is halftone or black.

13. The image forming apparatus of claim 11, wherein said printing means shortens a dot width so as to bring neighboring dots into contact with each other when printing is done with the size-reduced printing dot of the lengthwise line of the plural dot width.

14. The image forming apparatus of claim 12, wherein said printing means shortens a dot width so as to bring neighboring dots into contact with each other when printing is done with the size-reduced printing dot of the lengthwise line of the plural dot width.

15. The image forming apparatus of claim 10, wherein said pattern detecting means further detects whether or not said lengthwise line is a white lengthwise line of a single dot width or less than single dot width, on a basis of the patterns of the respective multi-value data of the target pixel and the circumferential pixels adjacent thereto in the main scanning direction; and said printing means performs the printing operation with further small printing dot of the white lengthwise line detected by said pattern detecting means.

16. The image forming apparatus of claim 10, wherein said pattern detecting means is provided with plural pattern detecting sections for detecting different patterns; and one of said plural pattern detecting sections to be operated can be selected.

17. The image forming apparatus of claim 10, wherein said pattern detecting means and said printing means create code data including data representing whether or not the data coincide with plural patterns and density data of the target pixel; and the size of the printing dot is changed by converting the data obtained by decoding the code data to the light-emitting data.

18. The image forming apparatus of claim 10, wherein said pattern detecting means and said printing means generate code data including data representing coincidence or non-coincidence with the plural patterns and density data of the target pixel;

the specified code data are generated in the case of coinciding with the specified pattern among the plural patterns; and the data obtained by decoding the code data are converted to the light-emitting data and thereby the size of the printing dot is changed.

19. A method of forming an image, comprising the steps of:

detecting whether or not a pattern is constructed with a lengthwise line of a single dot width on a basis of a pattern of respective multi-value data of a target pixel and circumferential pixels adjacent thereto in a main scanning direction, by use of a pattern detecting device; and printing size-reduced printing dots of said lengthwise line of the single dot width detected by said pattern detecting device, by use of a printing device.

20. The method of claim 19, further comprising the steps of:

further detecting whether or not the pattern is constructed with an edge of a lengthwise line of a plural dot width on a basis of a pattern of respective multi-value data of a target pixel and circumferential pixels adjacent thereto in a main scanning direction, by use of said pattern detecting device; and further printing size-reduced printing dots of said lengthwise line of the plural dot width detected by said pattern detecting device, by use of said printing device.

21. The method of claim 20, further comprising the step of:

judging whether or not said constructed lengthwise line is of the single dot width or of a plural dot width, when pixels neighboring right and left of the target pixel are white or black and the target pixel is halftone or black, by use of said pattern detecting device.

22. The method of claim 20, further comprising the step of:

shortening the dot width so as to bring neighboring dots into contact with each other when printing is done with the size-reduced printing dot of the lengthwise line of the plural dot width, by use of said printing device.

23. The method of claim 21, further comprising the step of:

shortening the dot width so as to bring neighboring dots into contact with each other when printing is done with the size-reduced printing dot of the lengthwise line of the plural dot width, by use of said printing device.

24. The method of claim 19, further comprising the steps of:

further detecting whether or not said lengthwise line is a white lengthwise line of a single dot width or less than the single dot width, on a basis of the patterns of the respective multi-value data of the target pixel and the circumferential pixels adjacent thereto in the main scanning direction, by use of said pattern detecting device; and performing the printing operation with further small printing dot of the white lengthwise line detected by said pattern detecting device, by use of said printing device.

25. The method of claim 19, further comprising the steps of:

providing plural pattern detecting sections for detecting different patterns, by use of said pattern detecting device; and selecting one of said plural pattern detecting sections to be operated.

26. The method of claim 19, further comprising the steps of:

creating code data including data representing whether or not the data coincide with plural patterns and density data of the target pixel, by use of said pattern detecting device and said printing device; and changing the size of the printing dot by converting the data obtained by decoding the code data to the light-emitting data.

27. The method of claim 19, further comprising the steps of:

generating code data including data representing coincidence or non-coincidence with the plural patterns and density data of the target pixel, by use of said pattern detecting device and said printing device;

generating the specified code data in the case of coinciding with the specified pattern among the plural patterns; and converting the data obtained by decoding the code data to the light-emitting data and thereby changing the size of the printing dot.

28. A computer program product comprising a computer storage medium having a computer program code mechanism embedded in the computer storage medium configured to perform the steps recited in any one of claims 19–27.

29. An image forming apparatus, comprising:

a pattern detecting device configured to detect whether or not a pattern is constructed with a white line of a single dot width or less on a basis of a pattern of respective multi-value data of a target pixel and circumferential pixels adjacent thereto in a main scanning direction; and a printing device configured to perform a printing operation with a smaller printing dot of the white line of the single dot width or less detected by said pattern detecting device.

30. An image forming apparatus, comprising:

pattern detecting means for detecting whether or not a pattern is constructed with a white line of a single dot width or less on a basis of a pattern of respective multi-value data of a target pixel and circumferential pixels adjacent thereto in a main scanning direction; and printing means for perform a printing operation with a smaller printing dot of the white line of the single dot width or less detected by said pattern detecting means.

31. A method of forming an image, comprising the steps of:

detecting whether or not a pattern is constructed with a white line of a single dot width or less on a basis of a pattern of respective multi-value data of a target pixel and circumferential pixels adjacent thereto in a main scanning direction, by use of a pattern detecting device; and printing perform a printing operation with a smaller printing dot of the white line of the single dot width or less detected by said pattern detecting device, by use of a printing device.

32. A computer program product comprising a computer storage medium having a computer program code mechanism embedded in the computer storage medium configured to perform the steps recited in claim 31.

* * * * *